United States Patent
Hentschel

(10) Patent No.: US 6,201,582 B1
(45) Date of Patent: Mar. 13, 2001

(54) CIRCUIT FOR MOIRÉ SUPPRESSION

(75) Inventor: Christian Hentschel, Hawthorne, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 08/933,575

(22) Filed: Sep. 19, 1997

(51) Int. Cl.[7] ...................................... H04N 5/21
(52) U.S. Cl. .................... 348/607; 348/624; 348/909; 348/627; 358/533
(58) Field of Search .............................. 348/607, 606, 348/624, 908, 909, 674, 806, 342, 627; 382/264, 260, 263; 358/533; H04N 5/21

(56) References Cited

U.S. PATENT DOCUMENTS

| | | | |
|---|---|---|---|
| 4,065,784 | * 12/1977 | Rossi | 348/392 |
| 4,823,186 | * 4/1989 | Muramatsu | 348/236 |
| 4,876,591 | * 10/1989 | Muramatsu | 348/236 |
| 5,175,621 | * 12/1992 | Maesato | 348/676 |
| 5,177,611 | * 1/1993 | Gibson et al. | 358/167 |
| 5,231,677 | 7/1993 | Mita et al. | 382/22 |
| 5,313,301 | * 5/1994 | Lee | 348/607 |
| 5,321,513 | * 6/1994 | Kondo et al. | 348/691 |
| 5,379,074 | * 1/1995 | Hwang | 348/606 |
| 5,400,083 | * 3/1995 | Mizusawa | 348/620 |
| 5,400,084 | * 3/1995 | Scarpa | 348/624 |
| 5,430,497 | * 7/1995 | Strolle et al. | 348/607 |
| 5,448,309 | * 9/1995 | Won | 348/607 |
| 5,471,323 | * 11/1995 | Suetsugi et al. | 358/511 |
| 5,473,373 | * 12/1995 | Hwung et al. | 348/254 |
| 5,490,094 | * 2/1996 | Heimburger et al. | 348/607 |
| 5,606,631 | * 2/1997 | Weiss et al. | 382/275 |
| 5,621,476 | * 4/1997 | Makita et al. | 348/620 |
| 5,638,134 | * 6/1997 | Kameyama et al. | 348/607 |
| 5,671,023 | * 9/1997 | Nishiwaki et al. | 348/675 |
| 5,710,594 | * 1/1998 | Kim | 348/254 |
| 5,777,698 | * 7/1998 | Park | 348/809 |
| 5,867,228 | * 2/1999 | Miki et al. | 348/624 |

FOREIGN PATENT DOCUMENTS 10271340  10/1998  (JP) ............................ H04N/1/409

* cited by examiner

Primary Examiner—John K. Peng
Assistant Examiner—Jean W. Désir
(74) Attorney, Agent, or Firm—Edward W. Goodman

(57) ABSTRACT

A circuit for moiré suppression detects the Nyquist frequency in an input video signal. Based on detected alternating structures indicative of the Nyquist frequency, the circuit fades between outputting the input video signal and a low-pass filtered version of the input video signal. When the output signal is applied to a video display, moiré is suppressed.

20 Claims, 13 Drawing Sheets

CIRCUIT FOR MOIRÉ SUPPRESSION

BACKGROUND OF THE INVENTION

1. Field of the Invention

The subject invention relates to video display apparatus and, in particular, to suppressing moiré disturbances in the displaying of video signals on the video display apparatus.

2. Description of the Related Art

Moiré is a term commonly used to describe disturbances on a video display which look like waves on water. A common example in the real world is the interference between two fences. Moiré appears when two sampling processes do not match each other, and there is insufficient filtering.

The description of moiré on video monitors is complex, because of the two dimensional nature and the completely different sampling structure of the screen of the monitor and that of the video signal. An easy way to describe the origins is given in the one-dimensional time and frequency domain. FIGS. 1A–1C show the structure of a sampling process of an incoming continuous signal. As shown in FIG. 1A, the sampling process may be done by an ideal analog-to-digital converter. The output data s(n) (FIG. 1C) are time discrete samples of the input signal s(t) (FIG. 1B) with a spacing of $1/f_s$, where $f_s$ is the sampling frequency. The spectrum of the input signal is repeated by the sampling frequency and all multiples of it. These frequencies will be called carriers, because their behavior is comparable to an amplitude modulation.

Moiré disturbances are caused by alias frequencies and beat frequencies. Alias frequencies appear when the repetition spectrum of the first carrier overlaps with the baseband. In this case, high signal frequencies cause low repetition frequencies. Disturbances caused by aliasing are not removable without loss of signal information, when the alias frequency occurs within the baseband bandwidth. The usable baseband is limited by the Nyquist frequency, which is half the sampling frequency.

Beat frequencies near the Nyquist limit are shown in FIGS. 2A–2C. The input signal (FIG. 2A) is below the Nyquist limit and the sampling process gives an additional frequency line at $f_s-f_o=0.53f_s$. The sampled signal (FIG. 2B) has a period of $1/f_o=1/(0.47fs)$, which is the signal frequency. Due to the fact that the signal frequency and the repetition frequency are close together, as shown in FIG. 2C, the frequency difference $f_b=|f_o-(f_s-f_o)|=|f_s-2f_o|$ can be seen as a beat frequency causing modulation in the sampled signal. The beat frequency is just the frequency difference of two physical frequencies, therefore, the beat frequency itself is not a physical frequency. To remove a beat frequency, at least the higher physical frequency must be suppressed. Unfortunately, beat frequencies often come along with alias frequencies.

FIGS. 3A–3C show a time discrete (or digital) low-pass filter along with the input signal spectrum |Si(f)| and the output signal spectrum |So(f)|. An important property of digital filters is the symmetrical frequency response to the Nyquist frequency. Low frequency aliasing cannot be suppressed without significant loss of signal information. In some cases, when the cutoff frequency is below the Nyquist limit, high frequency aliasing can be suppressed along with disturbing beat frequencies. Unfortunately, high signal frequencies would be suppressed in the same way. Beat frequencies can be removed by a digital low-pass filter when the cutoff frequency is significantly below the Nyquist limit.

The two-dimensional sampling process of the video signal creates carrier amplitudes at multiples of the video format, or so-called "resolution". For instance, FIG. 4 shows the frequency space of a graphics standard in the format 1600× 1200 pixels ($N_x \cdot N_y$). The first carrier frequency is determined by the distance of two pixels. Therefore, the first carrier amplitudes become $1/N_x$ and $1/N_y$, which is 1600 cy/pw and 1200 cy/ph (1600 cycles per picture width, and 1200 cycles per picture height).

As shown in FIG. 4, the Nyquist limit has a rectangular shape with borders at half of the sampling frequency. The video format 1600×100 pixels has a maximum resolution of 800 cy/pw in the horizontal, and 600 cy/ph in the vertical directions. The three patterns describe the limits at the Nyquist limit. In the horizontal direction, the Nyquist limit is given by alternating pixel amplitudes, while in the vertical, the Nyquist limit is given by alternating line amplitudes, and in the diagonal direction, by alternating pixel and line amplitudes, resulting in a checkerboard pattern.

Video moiré appears mostly at the Nyquist limit. The two patterns, checkerboard and alternating pixels (see FIG. 4), are most critical. Both have, in common, the horizontal Nyquist limit. Therefore, it is sufficient to suppress only the area around the horizontal Nyquist limit. In most cases, a two-dimensional low-pass filter is not needed, a one-dimensional horizontal low-pass filter is sufficient.

Linear low-pass filters have several disadvantages. The resolution will decrease and high contrast transitions will be muted resulting in the picture appearing less sharp. Also single lines or fine details will be seriously suppressed, and the picture impression becomes weak. Well-known non-linear filters, e.g., median filters, can preserve sharp edges, but small details will still be suppressed. Additionally, these filters create a certain amount of alias disturbances.

SUMMARY OF THE INVENTION

In general, it is an object of the invention to provide a non-linear filter which suppresses the Nyquist frequency, while leaving impulses and transitions unchanged. For the common case of video moiré at high horizontal input frequencies, it is desirable to limit the filter to a one-dimensional filter, operating in the horizontal direction.

The above object is achieved in a circuit for suppressing a Nyquist frequency in a video signal, said circuit comprising an input for receiving an input video signal; means coupled to said input for low-pass filtering said input video signal; means also coupled to said input for detecting a Nyquist frequency in said input video signal; and means, having inputs coupled to said input, said low-pass filtering means and said detecting means, for mixing said input video signal and an output of said low-pass filtering means in response to an output from said detecting means.

In a preferred embodiment of the invention, the detecting means comprises an input for receiving said input video signal; means coupled to said input for high-pass filtering said input video signal; means coupled to said input for bandpass filtering said input video signal; first and second means for forming an absolute value coupled, respectively, to outputs of said high-pass filtering means and said bandpass filtering means; and means coupled to outputs of said first and second absolute value forming means for forming a blending factor.

FIGS. 5B–5D show examples for suppressed and unchanged patterns by use of a non-linear filter for Nyquist frequency suppression. The decision is done within a processing window of 5 pixels in length (see FIG. 5A). The minimum length for this filter is 4 pixels, but there is no fixed maximum limit.

The advantages of the filter of the subject invention over linear filters, median filters, and other known non-linear filters are:

no loss of sharpness at transitions;

impulses remain with full amplitude (i.e., no degradation);

only alternating patterns, which result in moiré (beat and alias frequencies), will be suppressed;

usual video signals having a bandwidth limitation below the Nyquist frequency will almost be not affected; and small hardware or software cost.

BRIEF DESCRIPTION OF THE DRAWINGS

With the above and additional objects and advantages in mind as will hereinafter appear, the invention will be described with reference to the accompanying drawings, in which:

FIG. 1A shows an ideal A/D converter, while

FIG. 3A shows a discrete low-pass filter, while

FIG. 5A shows a window size of 5 pixels, while

FIG. 7A shows a window size of 5 pixels and the coefficients for a high-pass filter and a bandpass filter, while

FIG. 13A shows a block diagram of a modification of the Nyquist frequency detector of FIG. 6, while

DESCRIPTION OF THE PREFERRED EMBODIMENTS

Figure 1A:
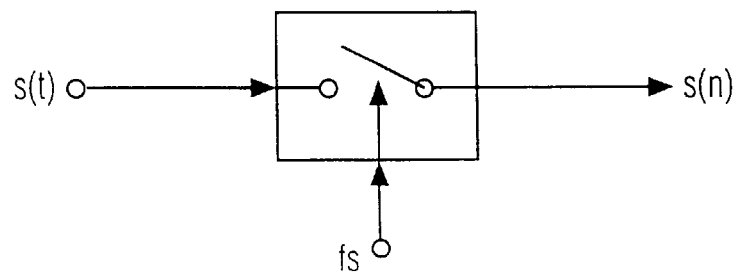
Figure 1B:
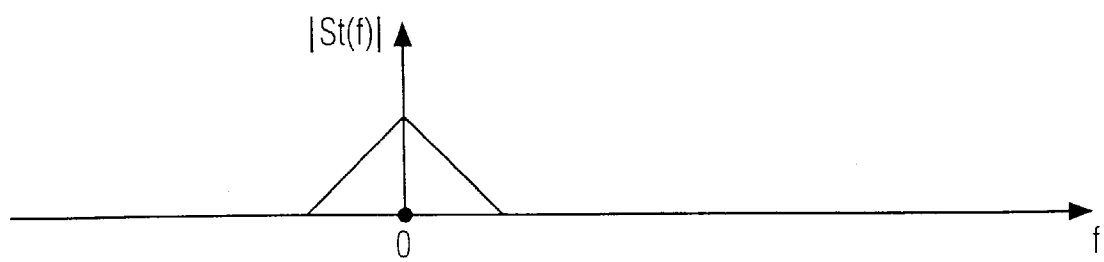
FIGS. 1B and 1C show the spectrums of the input and output signals.
Figure 1C:
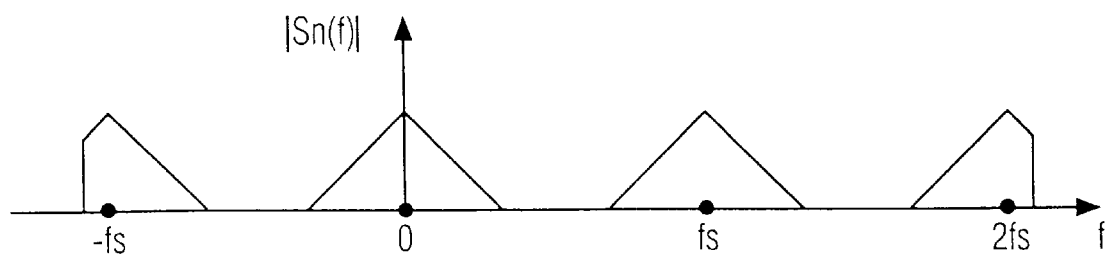
Figure 2A:
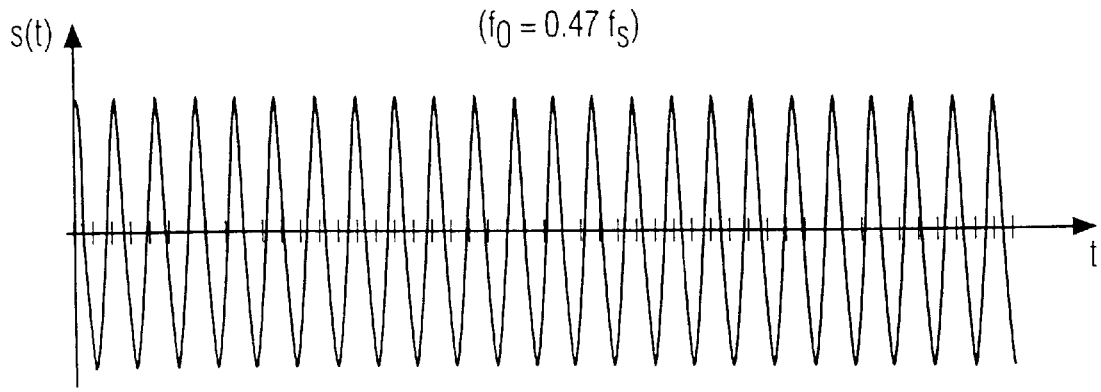
FIG. 2A shows the input signal below the Nyquist limit.
Figure 2B:
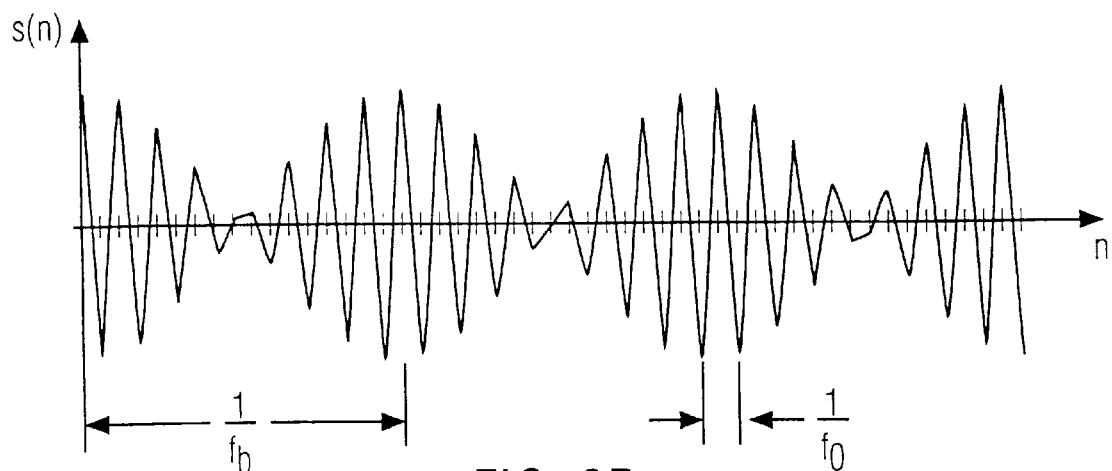
FIG. 2B shows the sampled signal.
Figure 2C:
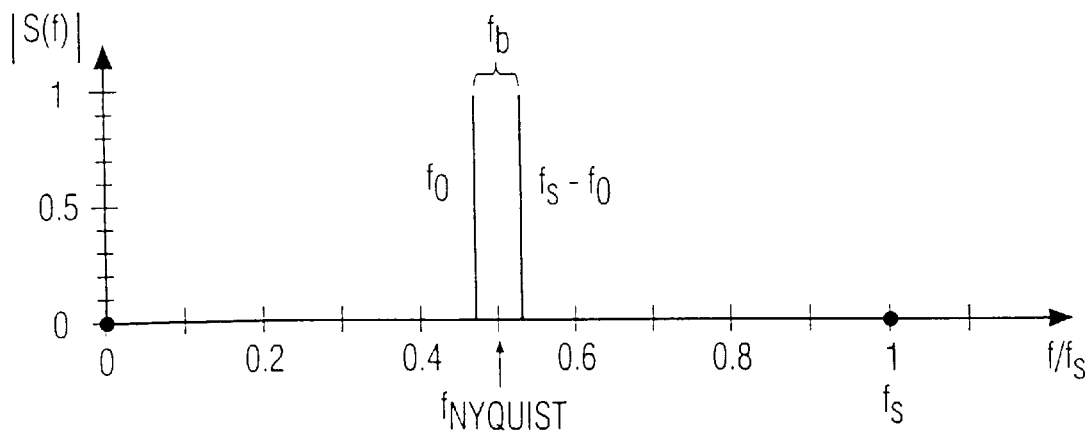
FIG. 2C shows the beat frequency.
Figure 3A:
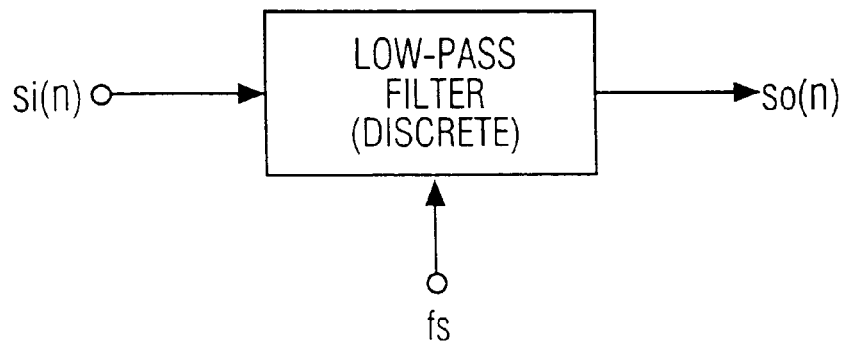
Figure 3B:
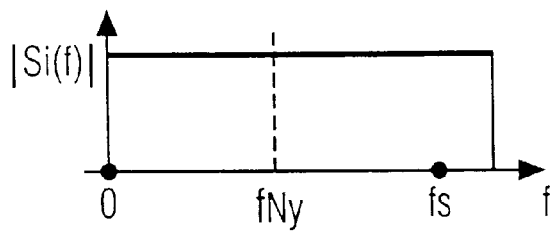
FIGS. 3B and 3C show the spectrums of the input and output signals.
Figure 3C:
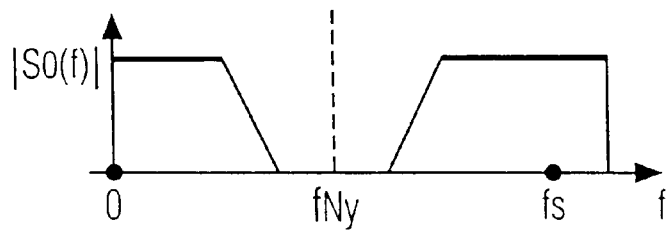
Figure 4:
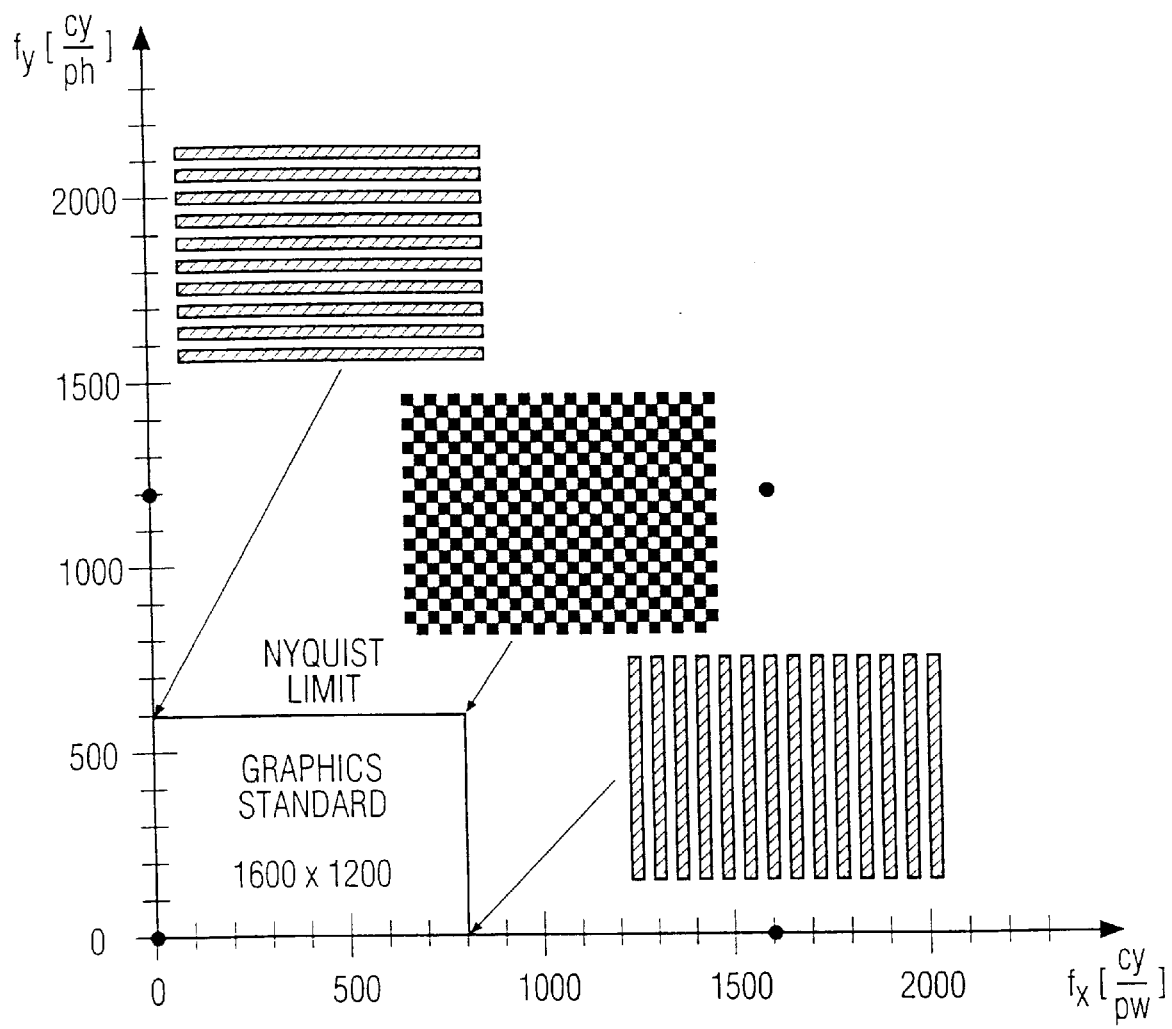
FIG. 4 shows the frequency space of a graphics standard in the format 1600×1200 pixels.
Figure 5A:
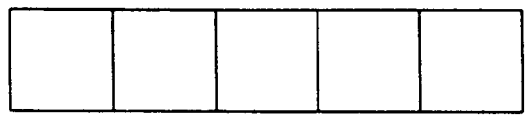
Figure 5B:
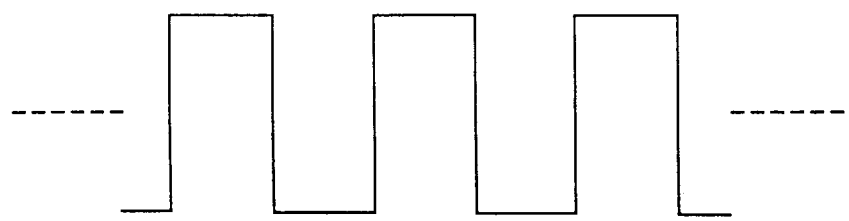
FIGS. 5B–5D show examples of suppressed and unchanged patterns.
Figure 5C:
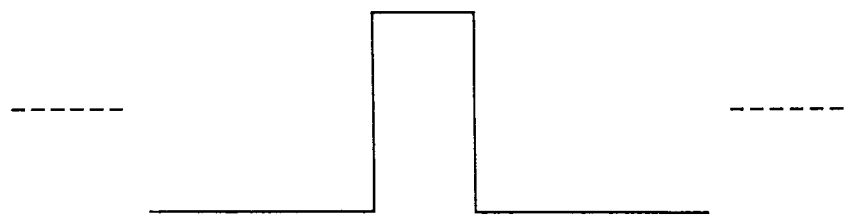
Figure 5D:
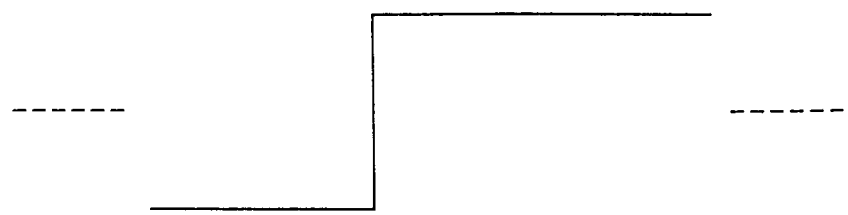
Figure 6:
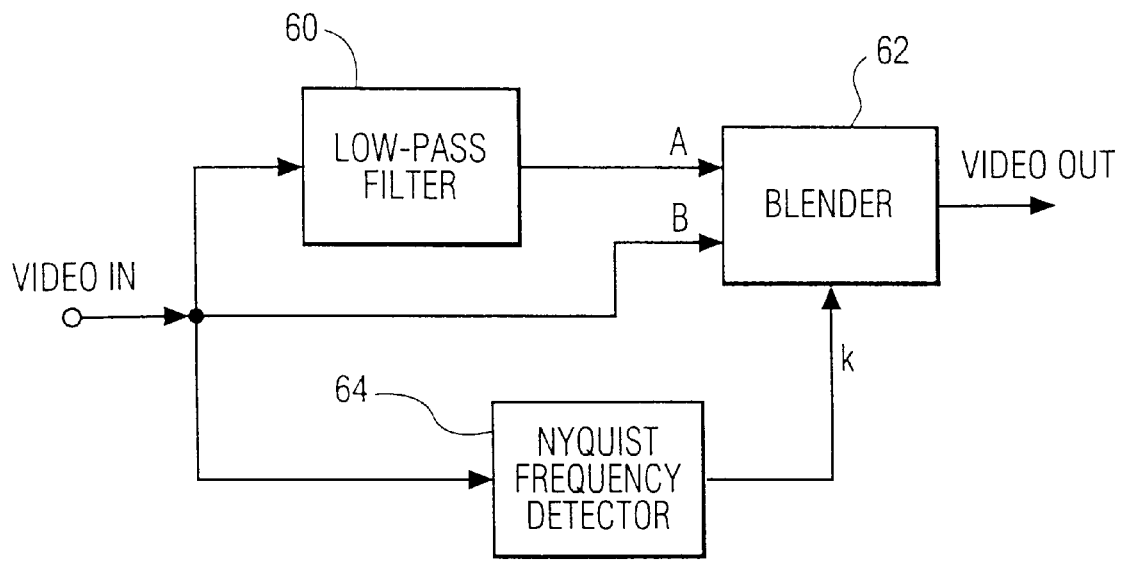
FIG. 6 shows a block diagram of the circuit of the subject invention.

As shown in FIG. 6, an input video signal is applied to a low-pass filter 60 which applies its output signal to an A input of a blender circuit 62. The input video signal is applied to a B input of the blender circuit 62. The low-pass filter 60 is dimensioned such that it suppresses signal frequencies starting slightly below the Nyquist frequency. The blender circuit 62 fades between the input video signal and the filtered signal depending on the blending signal k at its control input. This blending signal k is generated by a Nyquist frequency detector 64 connected to receive the input video signal and which detects periodic structure. The blending signal k varies between 0 and 1. If k=0, no alternating structure is detected, and the blender circuit 62 is faded to input B with the unchange input video signal. If k=1, an alternating structure is detected and the blender circuit 62 is faded to input A with the low-pass filtered video signal.

It should be noted that for simplicity, the block diagram of FIG. 6 does not show compensating delays for equalizing any delay between the input video signal, the low-pass filtered video signal and the detector 64 output blending signal k.

Figure 7A:
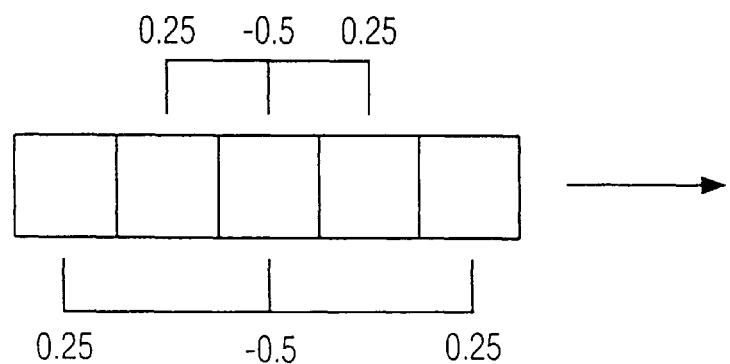
Figure 7B:
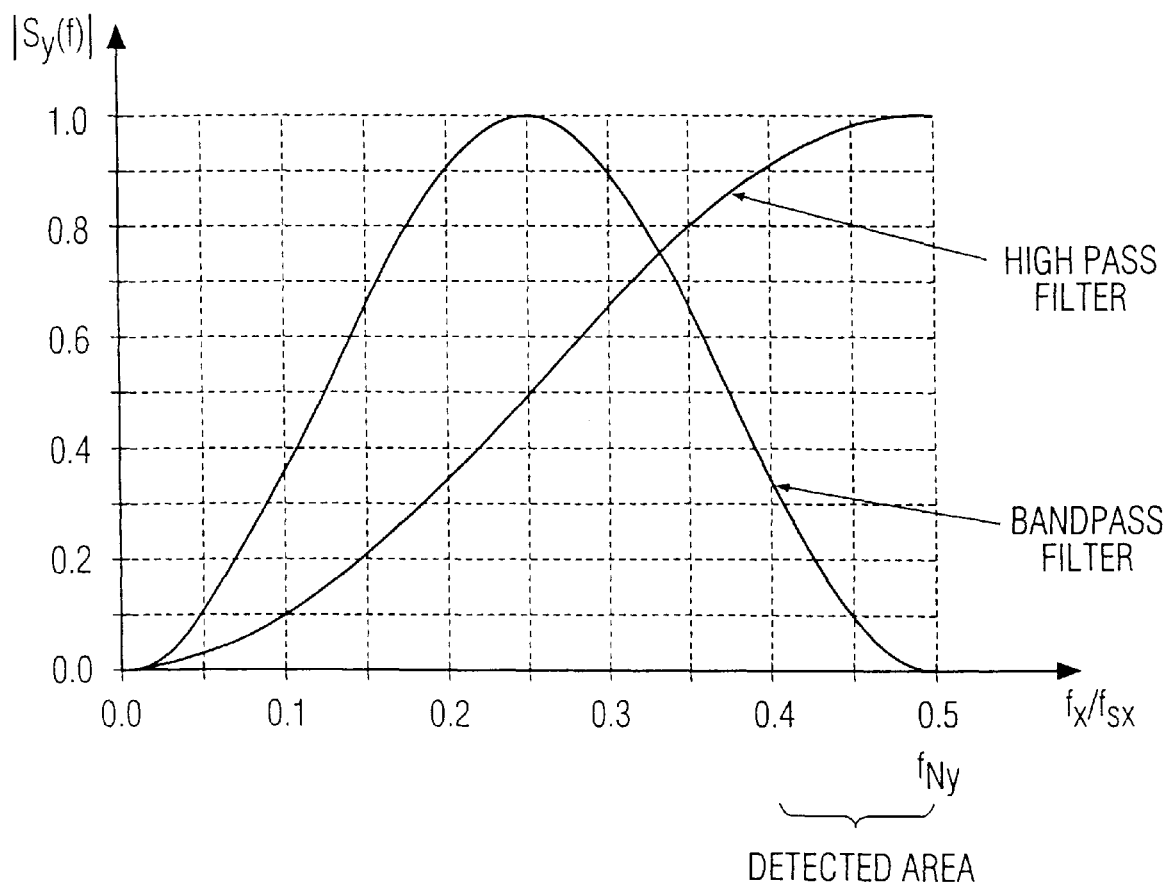
FIG. 7B shows the frequency responses of the high-pass and bandpass filters.

The Nyquist frequency detector 64 makes the decisions between alternating structure and single pulses or transitions. The detection area should be limited close to the Nyquist frequency. High-pass filters of high order have drawbacks due to costs, window size, and impulse response behavior. A different idea is to use two simple filters, one with a high-pass characteristic, and the second with a band-pass characteristic. FIG. 7A shows a window of 5 pixels along with the coefficients for these filters, while FIG. 7B shows the frequency responses of these filters. The high-pass filter has its maximum sensitivity at the Nyquist frequency, while the band-pass filter has its maximum sensitivity at half the Nyquist frequency and a zero position at the Nyquist frequency. The different behavior at the Nyquist frequency is useful for the detection. Only when the high-pass filter has an output signal significantly higher than the band-pass filter is the Nyquist frequency detected. The gain of one filter influences the detected bandwidth. Therefore, a small bandwidth close to the Nyquist frequency can be realized with two filters of low order.

Figure 8:
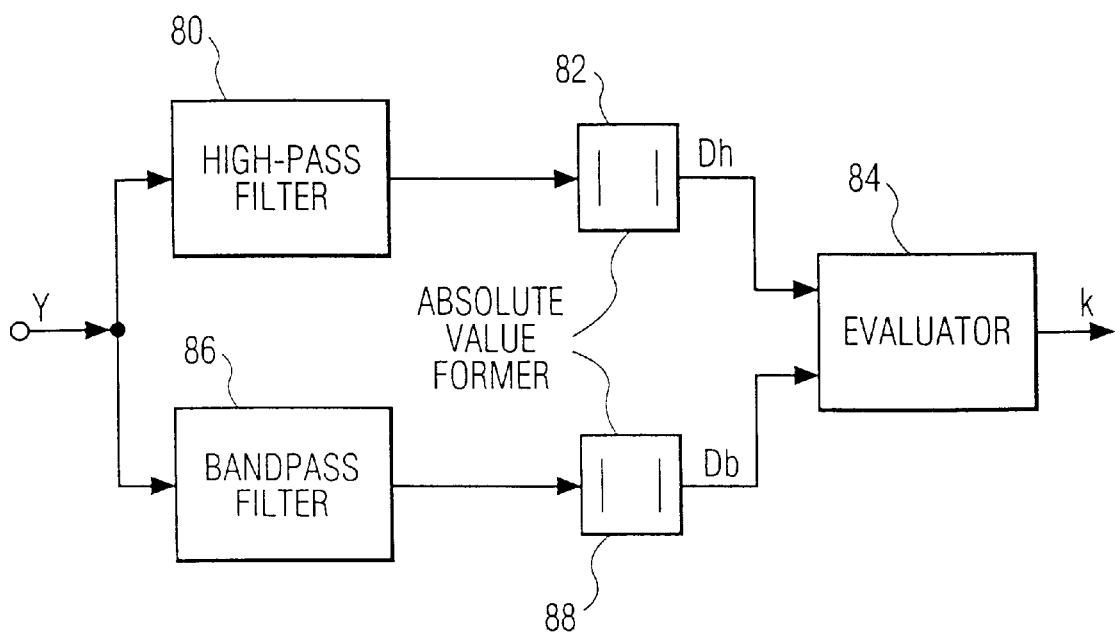
FIG. 8 shows a block diagram of the Nyquist frequency detector of the subject invention.

FIG. 8 shows a block diagram of the Nyquist frequency detector 64. The input signal is applied to a high-pass filter 80 and then through a first absolute value former 82 to a first input of an evaluator circuit 84. Similarly, the input signal is applied to a bandpass filter 86 and then through a second absolute value former 88 to a second input of the evaluator circuit 84. The first and second absolute value formers 82 and 88 are used to create absolute values since the phase of the signal is not important. The evaluator circuit 84 performs post-processing to generate the blending signal k. The post-processing may include a gain for one input signal to limit the detected bandwidth around the Nyquist frequency. A small offset can reduce noise influence or eliminate small input values, which cannot create significant moiré. Also, the evaluator circuit 84 may include a low-pass filter to achieve a fading over some pixels. This eliminates disturbances from the fading process.

Figure 9:
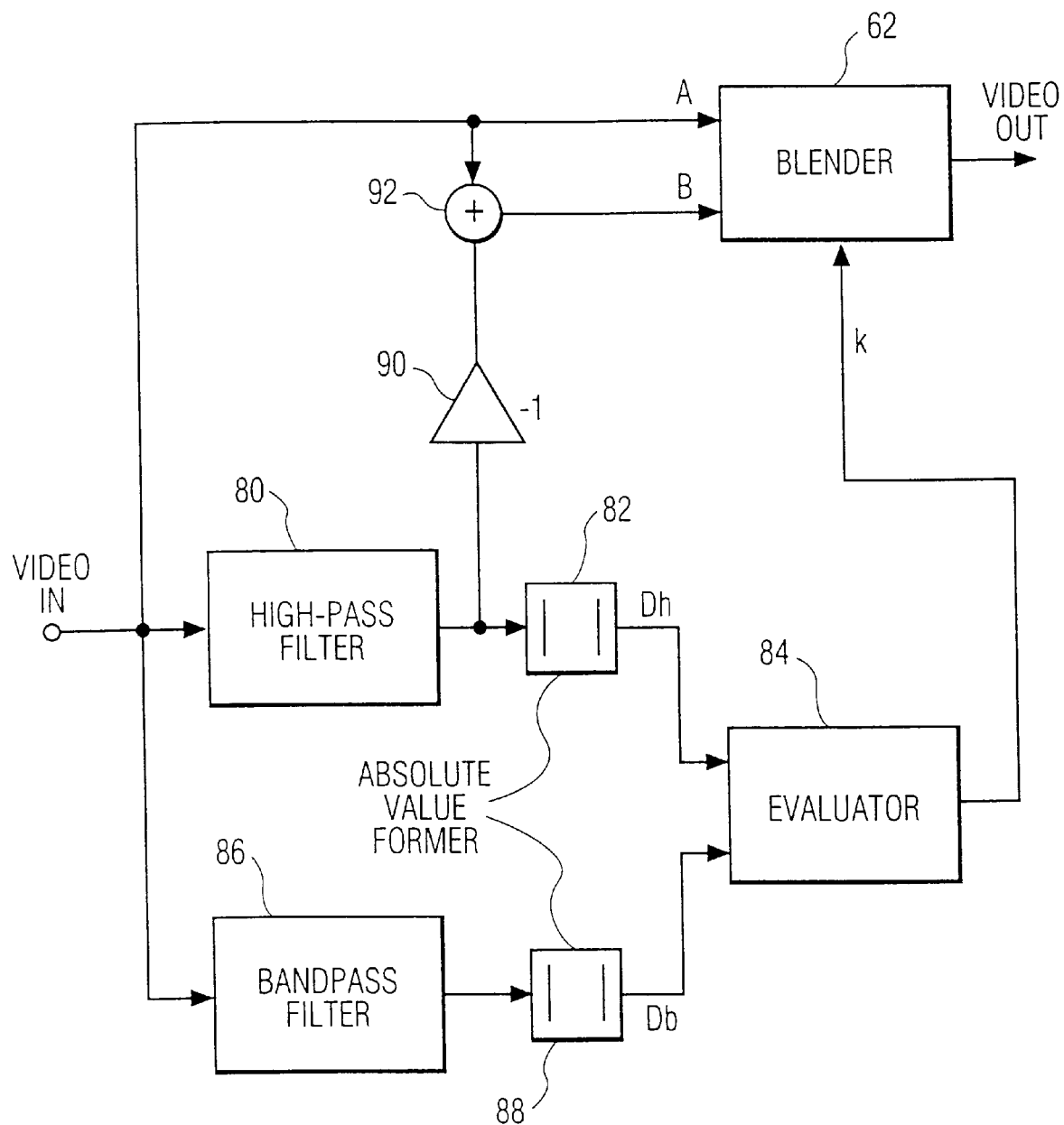
FIG. 9 shows the detector of FIG. 8 incorporated in the circuit of FIG. 6.

FIG. 9 shows a block diagram of the circuit of FIG. 6 in which the Nyquist frequency detector of FIG. 8 is incorporated. It should be noted that instead of the separate low-pass filter 60 of FIG. 6, the high-pass filter 80 of the Nyquist frequency detector 64 is used. In particular, the output signal from the high-pass filter 80 is additionally applied to an inverter 90 and then to one input of an adder 92. The other input of adder 92 is connected to receive the input video signal. The output from the adder 92 forms the B input of the blender circuit 62. The low-pass filtering is accomplished by subtracting the output from the high-pass filter 80 from the input video signal. Again, as in FIG. 6, compensating delays are not shown in FIG. 9.

Figure 10:
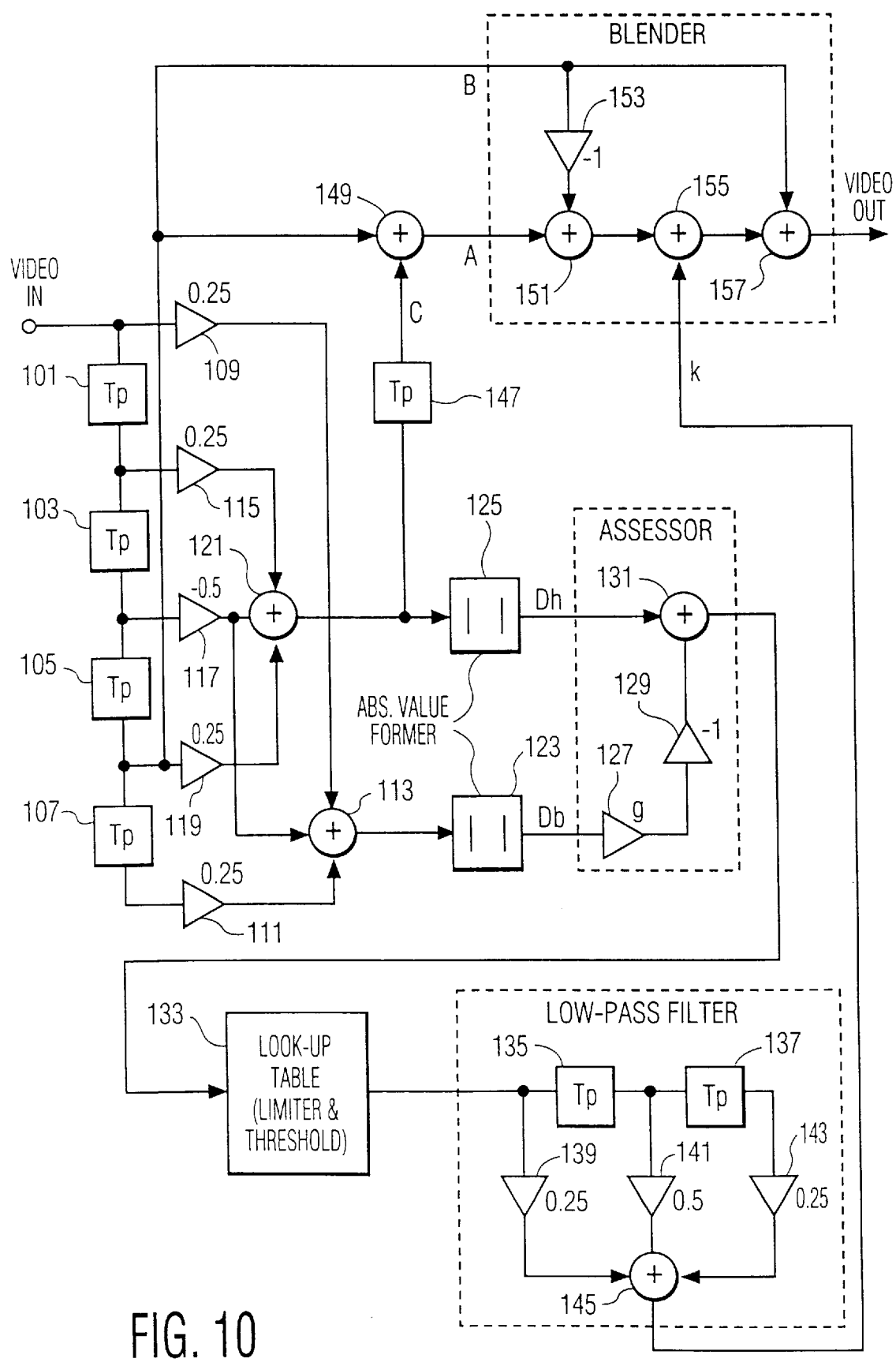
FIG. 10 shows a detailed block diagram of a practical implementation of the circuit of the subject invention.

FIG. 10 shows a detailed block diagram of a first embodiment of the circuit of the subject invention. The input video signal is applied to a series arrangement of pixel delays 101–107. The input video signal and the output from pixel delay 107 are applied through respective coefficient amplifiers 109 and 111, having coefficients of 0.25, to respective inputs of an adder 113. The outputs from pixel delays 101, 103 and 105 are applied, through respective coefficient amplifiers 115, 117 and 119, having coefficients 0.25, −0.5 and 0.25, respectively, to respective inputs of an adder 121. The output from pixel delay 103, through the coefficient amplifier 117, is applied to a further input of adder 113. The pixel delays 101–107, the adders 113 and 121, and the coefficient amplifiers 109, 111, 115, 117 and 119, form the high-pass and band-pass filters 80 and 86. Because of the simple coefficient values 0.25 and −0.5, respectively, no multipliers are needed, these coefficients being realized by a simple bit shift.

The outputs from adders 113 and 121 are applied to respective absolute value formers 123 and 125 for forming the absolute values $D_b$ and $D_h$. The output from the absolute value former 123 ($D_b$) is applied through a amplifier 127, having a gain of g, and an inverter 129 to a second input of the adder 131, while the output from absolute value former 125 ($D_h$) is applied directly to one input of an adder 131, thereby effectively subtracting the gain adjusted absolute value $g \cdot D_b$ from the absolute value $D_h$. The output value from the adder 131 is applied to a look-up table 133 which acts as a limiter to provide output values between 0 and 1. The look-up table 133 may also introduce a small threshold or offset value. The output signal from the look-up table 133 is then applied to a low-pass filter formed by serially-arranged pixel delays 135 and 137 and coefficient amplifiers 139, 141 and 143, having coefficients of 0.25, 0.5 and 0.25, respectively, connected to the input and output of pixel delay 135 and to the output of pixel delay 137, respectively. The outputs from the coefficient amplifiers 139, 141 and 143 are applied to an adder 145. The low-pass filter thus formed generates a slow changing blending signal k, which avoids modulation error between the signals at the A and B inputs of the blender circuit 62.

The band-pass filter and the high-pass filter 86 and 80 have a group delay of 2 pixels, in addition to a delay of one pixel due to the low-pass filter at the output of the Nyquist frequency detector 64. This delay of 3 pixels also applies to the signals at the inputs A and B of the blender circuit 62. In particular, the output signal from the adder 121 is applied through a pixel delay 147 to a first input of an adder 149, while the output from the pixel delay 105 is applied to a second input of the adder 149. The output from the adder 149 forms the A input of the blender circuit 62, while the output from the pixel delay 105 is applied directly to the blender circuit 62 forming the B input.

The blender circuit includes a first adder 151 having a first input connected directly to the A input and a second input connected to the B input through an inverter 153. A second adder 155 has a first input connected to the output of the first adder 151 and a second input connected to receive the blending signal k. A third adder 157 has a first input connected to the output of the second adder 155 and a second input connected to the B input. The output of the third adder 157 forms the output of the circuit of the subject invention. The blender circuit 62 performs the function $$k \cdot A + (1-k) \cdot B.$$

If no alternating structures (Nyquist frequency) are detected, k becomes 0 and the unfiltered video signal at B appears at the output. The blender circuit function may also be expressed as follows:

$$k \cdot A + (1-k) \cdot B = (A-B) \cdot k + B.$$

As such, only one multiplication is required.

Figure 11:
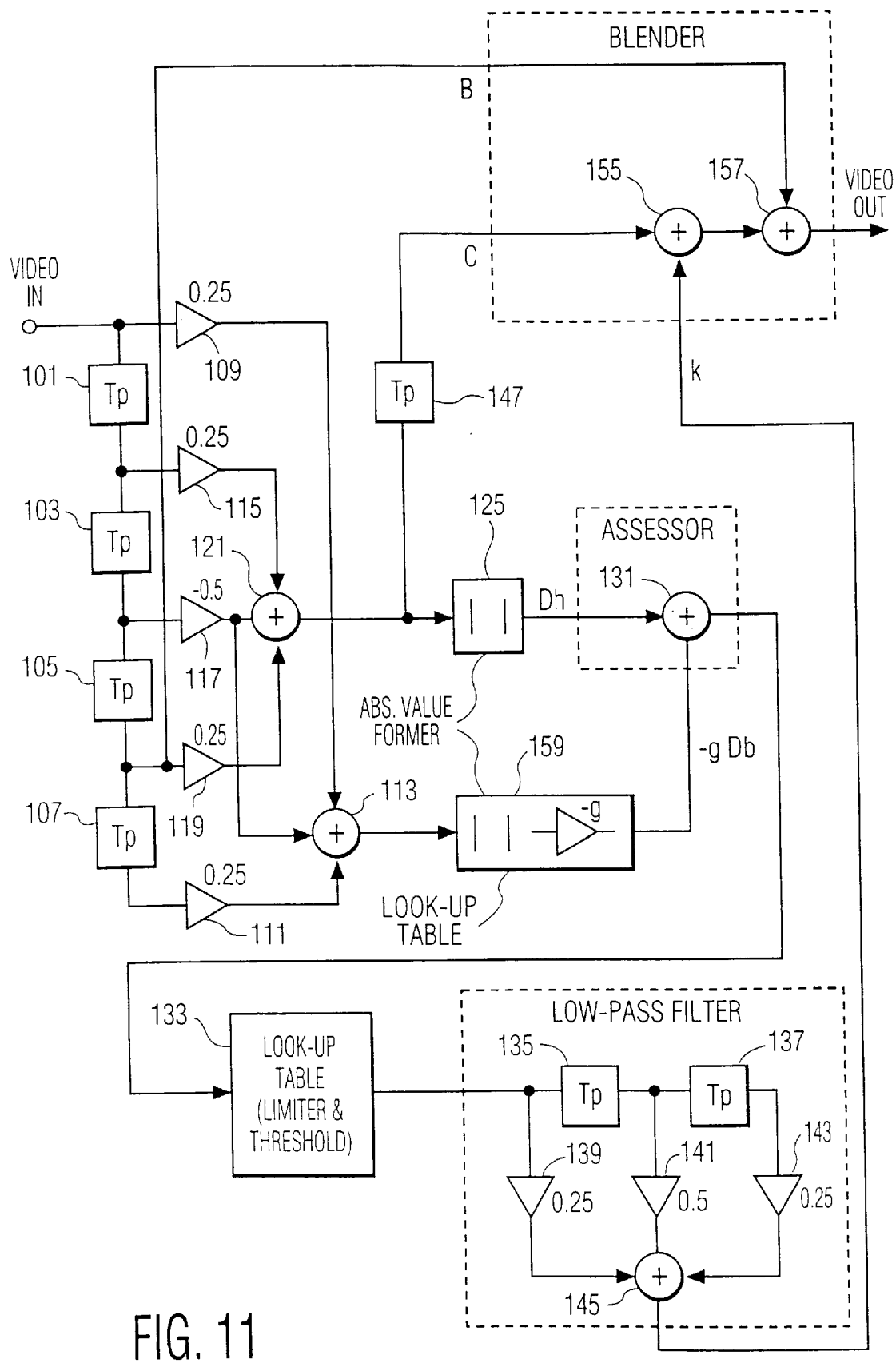
FIG. 11 shows a detailed block diagram of an optimized version of the circuit shown in FIG. 10.

FIG. 11 shows an alternate embodiment of the circuit of the invention in which the circuit shown in FIG. 10 is simplified. In particular, the absolute value former 123, the amplifier 127 and the inverter 129 may be replaced by a look-up table 159 which forms the signal $-g \cdot D_b$. Furthermore, the adders 149 and 151 and the inverter 153 have been eliminated and the low-pass filtered version of the input signal is calculated from B+C. this operation is shown by the following function:

$$(A-B) \cdot k + B = ((B+C)-B) \cdot k + B = C \cdot k + B.$$

Figure 12:
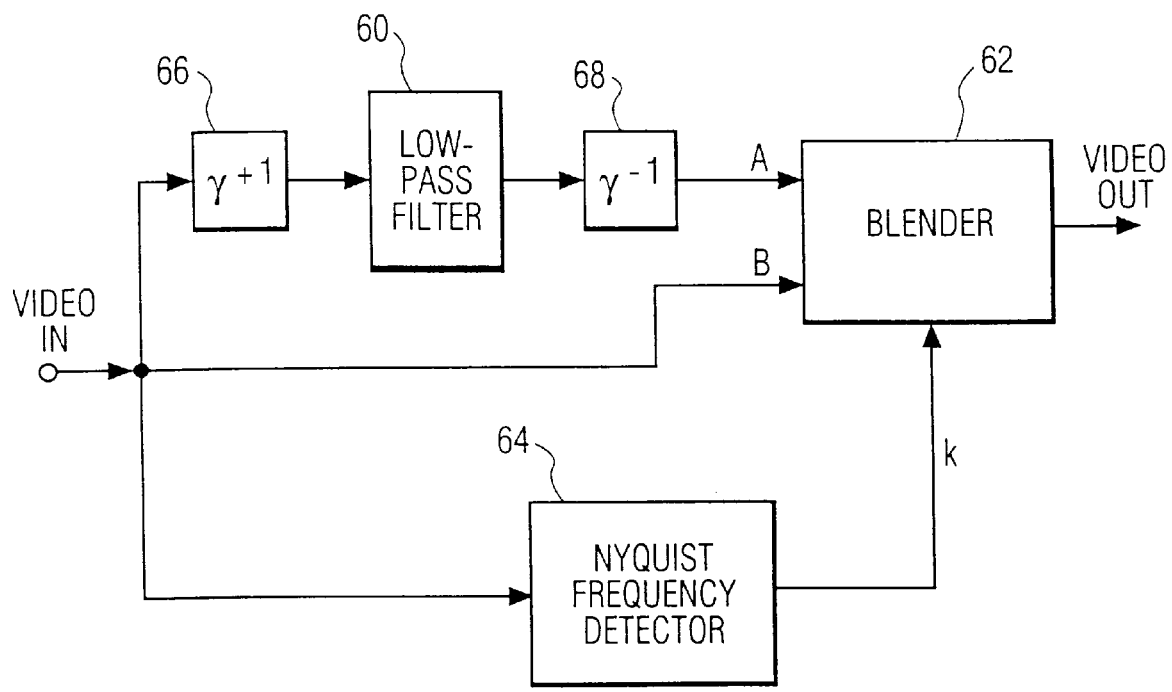
FIG. 12 shows a block diagram of a modification of the subject invention as shown in FIG. 6.

Applicant has further found that the low-pass filtering of non-linear input signals causes an amplitude difference in the stopband to the average luminance on the display. In, for example, a television camera, the video signal is subjected to an inverse gamma function (non-linear) to compensate for a cathode ray tube used to display the output video signal. While it is well known to correct this by using a gamma function before the circuit and an inverse gamma function after the circuit, this has the disadvantage of requiring higher quantization for the entire signal processing. Furthermore, this also detrimentally affects the Nyquist frequency detector. FIG. 12 shows a modification of the embodiment of FIG. 6 in which in the low-pass filter 60 signal path, a gamma corrector 66 is inserted before the low-pass filter 66 and an inverse gamma corrector 68 is inserted after the low-pass filter 60. In operation, this arrangement better matches the characteristics of the human vision system.

Figure 13A:
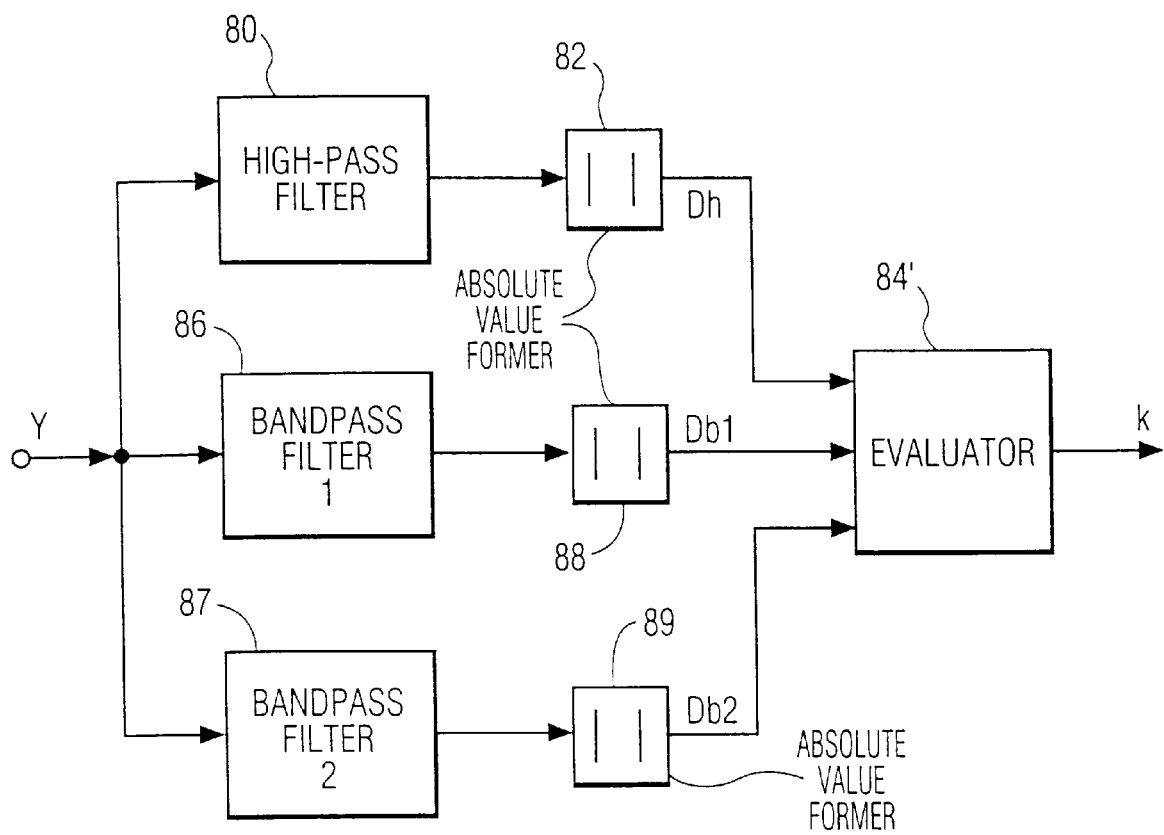

In an alternate embodiment as shown in FIG. 13A, the Nyquist frequency detector of FIG. 8 now includes an additional bandpass filter 87 which also receives the video signal. The output from the bandpass filter 87 is applied to an absolute value former 89 which applies its output signal $D_{b2}$, along with the output $D_h$ from the absolute value former 82 and the output $D_{b1}$ from the absolute value former 88, to the evaluator 84' which then forms the blender signal k.

Figure 13B:
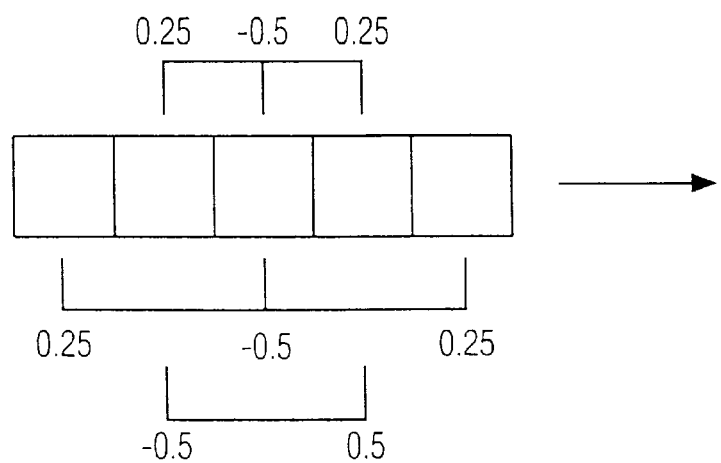
FIG. 13B shows a window size of 5 pixels and the coefficients for the high-pass filter and the two bandpass filters.

FIG. 13B shows a pixel window of 5 pixels along with the coefficients for the high-pass filter 80, the bandpass filter 84, and the bandpass filter 87. It should be apparent, when compared with FIG. 7A, that the high-pass filter 80 and the bandpass filter 86 have the same coefficients as in the earlier embodiment, while the bandpass filter 87 has the coefficients −0.5 and −0.5. While the bandpass filters 86 and 87 have similar frequency and group delay characteristics, as shown by the diagram in FIG. 13B, the impulse responses, or group delays, of the bandpass filters 86 and 87 differ to the extent that they are offset from each other by one pixel. This has the effect that single lines or pulses will be undetected and will keep their shape without blurring.

Figure 14:
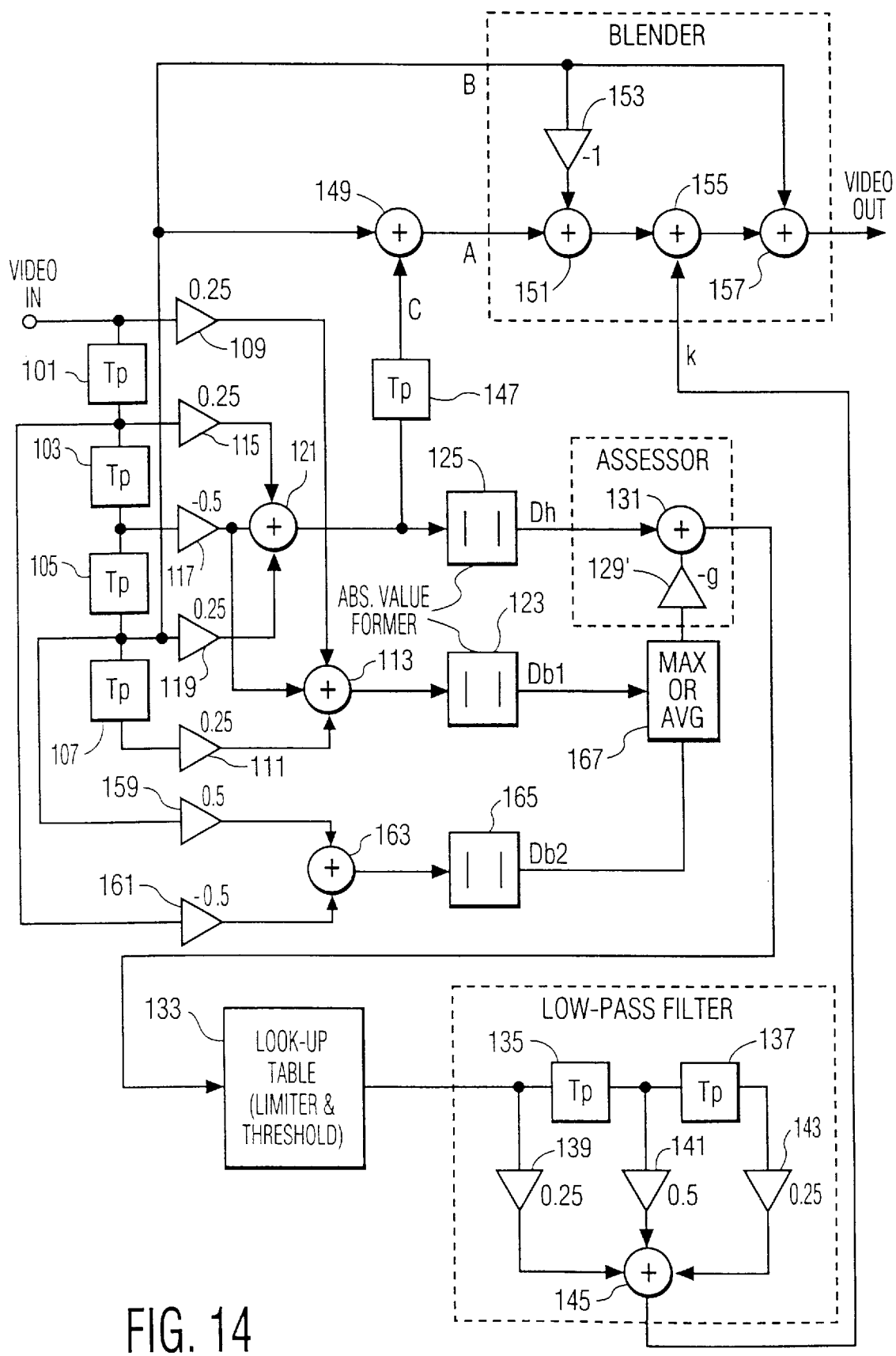
FIG. 14 shows a detailed block diagram of the circuit of the subject invention as in FIG. 11 including the Nyquist frequency detector of FIG. 13A.

FIG. 14 shows a detailed block diagram of the circuit of the subject invention including the Nyquist frequency detector of FIG. 13A. In particular, the embodiment of FIG. 14 is substantially similar to that of FIG. 11 with the exception that the output from pixel delay 105 is additionally applied to a coefficient amplifier 159 having the coefficient 0.5, while the output from pixel delay 101 is additionally applied to a coefficient amplifier 161 having the coefficient −0.5. The outputs from the coefficient amplifiers 159 and 161 are added in adder 163 and applied to an absolute value former 165. The outputs from the absolute value former 123 and 165 are applied to a circuit 167 which selects the maximum value (or forms the average) and applies the output to an amplifier 129' having a gain of −g, the output therefrom being applied to the adder 131.

Figure 15:
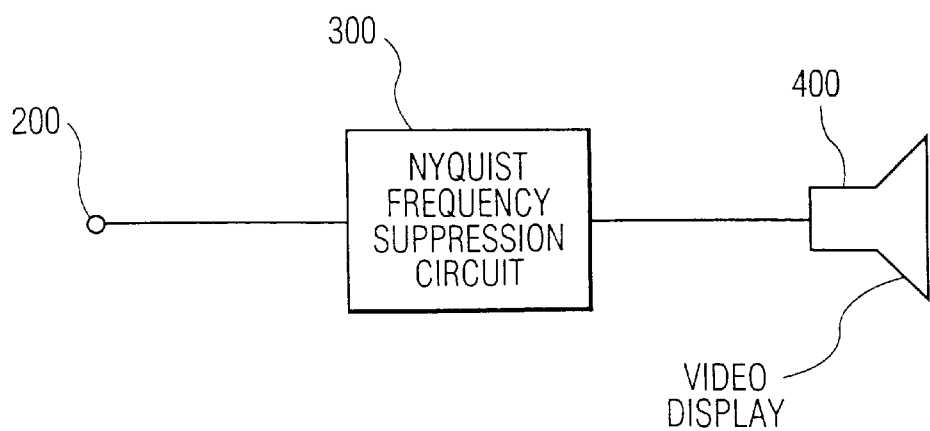
FIG. 15 shows an application of the subject invention in a video display device.

FIG. 15 shows a video display apparatus incorporating the subject invention including an input 200 for receiving a video signal, a Nyquist frequency suppression circuit of the subject invention 300 connected to the input, and a video display 400, for example a cathode ray tube, connected to the output of the Nyquist frequency suppression circuit 300 for displaying the video signal absent any moiré.

The above descriptions treat the video signal as a monochrome signal. It should be noted that the subject invention may also be applied to a color video signal. In particular, in the case of a luminance signal Y and two chrominance signals $C_R$ and $C_B$, the following three arrangements may be used:

(1) only the luminance channel Y is processed and not the chrominance signals $C_R$ and $C_B$ (while some color moiré may appear, this arrangement has less hardware expenditure);
(2) The Nyquist frequency detector is connected only to the Y signal, and the output signal k is a fading control signal for all three channels Y, $C_R$ and $C_B$; or
(3) Each channel Y, $C_R$ and $C_B$ are processed independently (while this may result in error in hue especially at transitions, these error are predictable).

In the case of direct color signals (red (R), green (G) and blue (B)), the following two arrangements may be used:

(1) The Nyquist frequency detector is connected only to the G signal, and the output signal k is a fading control signal for the three channels R, G and B; or
(2) The color signals R, G and B are matrixed to form a Y signal which is then connected to the Nyquist frequency detector, the output signal k is then used as a fading signal for the three channels R, G and B.

It should also be noted that while the above description may be based in hardware, a suitably programmed digital processor may alternatively be used. In that case, for example, the low-pass filter, the Nyquist frequency detector and the blender, would be implemented in the software for the digital processor. The programmed digital processor then acts as a non-linear filter for the Nyquist frequency.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A circuit for suppressing a Nyquist frequency in a video signal, said circuit comprising:
   an input for receiving an input video signal;
   means coupled to said input for low-pass filtering said input video signal, said low-pass filtering means suppressing signal frequencies starting below a Nyquist frequency in said input video signal;
   means also coupled to said input for detecting said Nyquist frequency in said input video signal; and
   means, having inputs coupled to said input, said low-pass filtering means and said detecting means, for mixing said input video signal and an output of said low-pass filtering means in response to a blending signal from said detecting means.

2. A circuit as claimed in claim 1, characterized in that said detecting means comprises:
   an input for receiving said input video signal;
   means coupled to said input for high-pass filtering said input video signal, said high-pass filtering means having a maximum sensitivity at said Nyquist frequency;
   means also coupled to said input for bandpass filtering said input video signal, said bandpass filtering means having a maximum sensitivity at one-half said Nyquist frequency and a zero sensitivity at said Nyquist frequency;
   first and second means for forming an absolute value coupled, respectively, to outputs of said high-pass filtering means and said bandpass filtering means; and
   means coupled to outputs of said first and second absolute value forming means for forming said blending signal.

3. A circuit as claimed in claim 2, wherein said blending signal forming means comprises low-pass filtering means.

4. A circuit as claimed in claim 2, wherein said low-pass filtering means comprises means for subtracting an output signal from said high-pass filtering means from said input video signal.

5. A circuit as claimed in claim 2, wherein said high-pass filtering means comprises a series arrangement of three delay elements having one end coupled to receive said input video signal; coefficient amplifiers coupled, respectively, to outputs of each of said three delay elements; and an adder for adding output signals from said coefficient amplifiers.

6. A circuit as claimed in claim 5, wherein said bandpass filtering means comprises a fourth delay element coupled to an end of said series arrangement remote from said one end; further coefficient amplifiers coupled, respectively, to said one end of said series arrangement and to an output of said fourth delay element; and an adder for adding output signals from said further coefficient amplifiers and the coefficient amplifier connected to the output from the second delay element in said series arrangement of three delay elements.

7. A circuit as claimed in claim 2, wherein said blending signal forming means comprises:
   means for subtracting an output signal of said bandpass filtering means from an output signal of said high-pass filtering means thereby forming a difference signal; and
   a look-up table coupled to receive said difference signal, for normalizing said difference signal to values between 0 and 1, an output of said look-up table providing said blending signal.

8. A circuit as claimed in claim 7, wherein said blending signal forming means further comprises a low-pass filter coupled to the output of said look-up table for eliminating disturbances in said blending signal.

9. A circuit as claimed in claim 2, wherein said detecting means further comprises:
   further bandpass filtering means coupled to said input, said further bandpass filtering means also having a maximum sensitivity at one-half said Nyquist frequency and a zero sensitivity at said Nyquist frequency; and
   further means for forming an absolute value coupled to an output of said further bandpass filtering means, an output of said further absolute value forming means also being coupled to said means for forming said blending signal.

10. A circuit as claimed in claim 9, wherein said bandpass filtering means has an impulse response, for 5 consecutive pixels, of 0.25, 0, −0.5, 0, 0.25, and said further bandpass filtering means has an impulse response, for 5 consecutive pixels, 0, 0.5, 0, −0.5, 0.

11. A circuit as claimed in claim 9, wherein said blending signal forming means comprises low-pass filtering means.

12. A circuit as claimed in claim 9, wherein said low-pass filtering means comprises means for subtracting an output signal from said high-pass filtering means from said input video signal.

13. A circuit as claimed in claim 9, wherein said high-pass filtering means comprises a series arrangement of three delay elements having one end coupled to receive said input video signal; coefficient amplifiers coupled, respectively, to outputs of each of said three delay elements; and an adder for adding output signals from said coefficient amplifiers.

14. A circuit as claimed in claim 13, wherein said bandpass filtering means comprises a fourth delay element coupled to an end of said series arrangement remote from said one end; further coefficient amplifiers coupled, respectively, to said one end of said series arrangement and to an output of said fourth delay element; and an adder for adding output signals from said further coefficient amplifiers and the coefficient amplifier connected to the output from the second delay element in said series arrangement of three delay elements.

15. A circuit as claimed in claim 14, wherein said further bandpass filtering means comprises additional coefficient amplifiers coupled to outputs of a first and a third delay element in said series arrangement of three delay elements, and an adder for adding output signals from said additional coefficient amplifiers.

16. A circuit as claimed in claim 9, wherein said blending signal forming means comprises:

means for determining a maximum absolute value from said bandpass filtering means and said further bandpass filtering means;

means for subtracting an output signal of said determining means from an output signal of said high-pass filtering means thereby forming a difference signal; and a look-up table coupled to receive said difference signal, for normalizing said difference signal to values between 0 and 1, an output of said look-up table providing said blending signal.

17. A circuit as claimed in claim 16, wherein said blending signal forming means further comprises a low-pass filter coupled to the output of said look-up table for eliminating disturbances in said blending signal.

18. A circuit as claimed in claim 1, wherein said circuit further comprises a first processing means having a non-linear function coupled between said input and said low-pass filtering means; and a second processing means having a non-linear function inverse to that of said first processing means coupled between said low-pass filtering means and said mixing means.

19. A circuit as claimed in claim 18, wherein said first processing means is a gamma correction circuit, and said second processing means is an inverse gamma correction circuit.

20. A video display device including means for suppressing moiré in a video signal displayed on said video display device, said video display device comprising:

an input for receiving an input video signal;

a means for suppressing moiré, said means comprising a circuit for suppressing a Nyquist frequency in a video signal, said circuit comprising an input for receiving said input video signal; means coupled to said input for low-pass filtering said input video signal, said low-pass filtering means suppressing signal frequencies starting below a Nyquist frequency in said input video signal; means also coupled to said input for detecting said Nyquist frequency in said input video signal; and means, having inputs coupled to said input, said low-pass filtering means and said detecting means, for mixing said input video signal and an output of said low-pass filtering means in response to a blending signal from said detecting means, and output of said mixing means providing an output video signal with suppressed Nyquist frequency; and a video display coupled to the output of said moiré suppressing means for displaying said output video signal.

* * * * *